United States Patent
Matsuura

[15] 3,695,66[5]
[45] Oct. 3, 197[2]

[54] SHOCK ABSORBING BUFFER

[72] Inventor: Hirotsugu Matsuura, 1-32, 5-chome, Kudo, Oji-cho, Kitakatsuragi-gun, Nara-ken, Japan

[22] Filed: Sept. 14, 1970

[21] Appl. No.: 71,723

[52] U.S. Cl. ...................293/70, 180/92, 267/116, 267/112, 267/139, 293/1, 293/60, 293/71 P, 293/71 R, 293/98
[51] Int. Cl. .....B60r 19/08, B61f 19/04, B61q 11/12
[58] Field of Search....116/28; 293/1, 51 F, 66, 71 R, 293/71 P, 88, 98, 60, 70; 180/92; 267/116, 122, 139

[56] References Cited

UNITED STATES PATENTS

| | | | |
|---|---|---|---|
| 1,843,902 | 2/1932 | Ridge | 180/92 |
| 2,873,994 | 2/1959 | Omps | 293/86 |
| 3,588,159 | 6/1971 | Duckett et al. | 293/1 |
| 3,588,158 | 6/1971 | Walker et al. | 293/1 |
| 3,187,710 | 6/1965 | Wilfert | 116/28 |
| 3,572,799 | 3/1971 | Truesdell et al. | 293/1 |
| 2,614,877 | 10/1952 | Benian | 293/71 R |
| 1,485,332 | 2/1924 | Edwards | 293/71 R |
| 1,601,641 | 9/1926 | Ostria | 293/71 |
| 2,128,656 | 8/1938 | Long | 293/6[0] |
| 2,147,745 | 2/1939 | MacKinnon | 293/98 |
| 2,236,507 | 4/1941 | Kreitz | 293/71 |
| 3,014,710 | 12/1961 | Layne | 293/88 |

*Primary Examiner*—Arthur L. La Point
*Assistant Examiner*—Howard Beltran
*Attorney*—George B. Oujevolk

[57] ABSTRACT

A bumper of the shock absorbing system to be attached to the front and the rear of the automobile said bumper being a tubular hollow member consisting of an elastic material, such as a soft synthetic resin and the like, the inside thereof being filled with fluid e.g., liquid or gas, it being so arranged that the fluid inside said tubular hollow member can flow into an absorbing hollow member communicating with said tubular hollow member through a resistance tube or check valve exclusively when the bumper receives shock.

4 Claims, 18 Drawing Figures

PATENTED OCT 3 1972     3,695,665
SHEET 1 OF 3
FIG,1
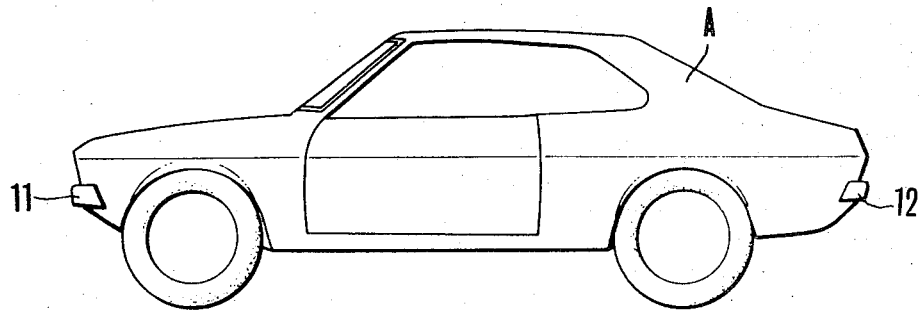
FIG,2  FIG,3
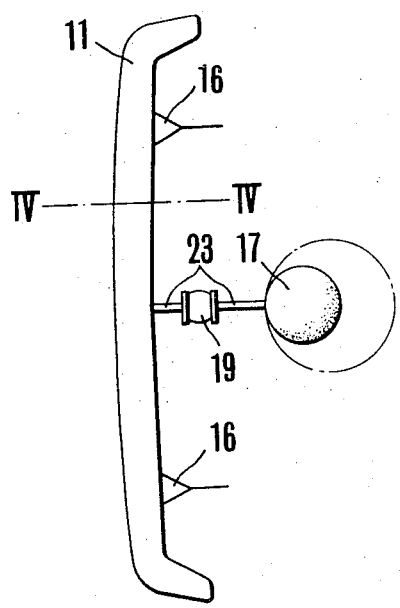 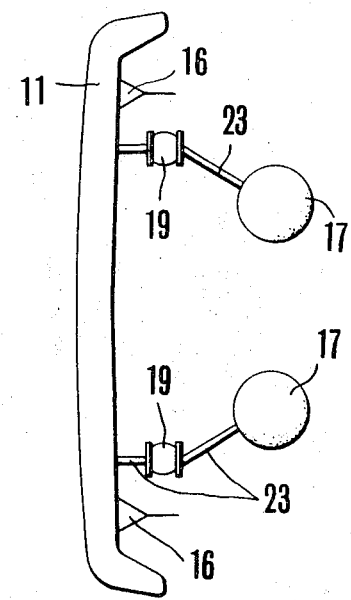
FIG,4  FIG,5
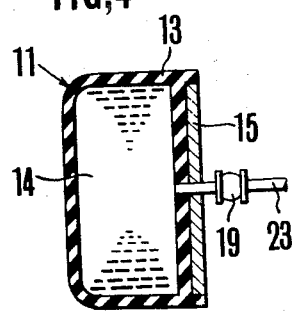 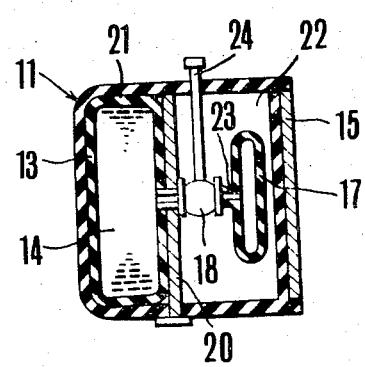
INVENTOR.
Hirotsugu Matsuura
BY George B. Oujevolk
Attorney

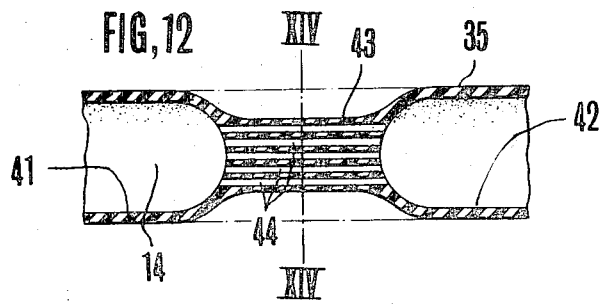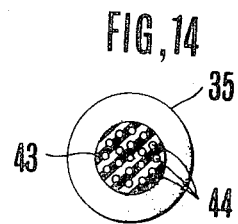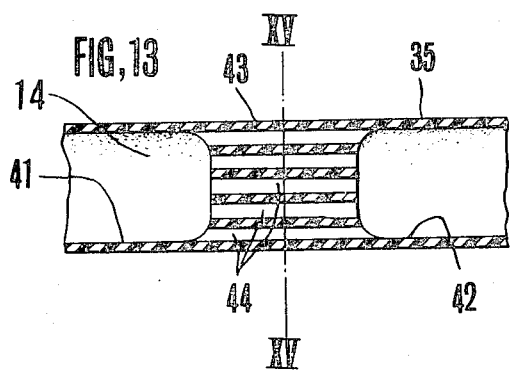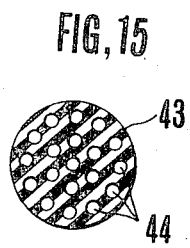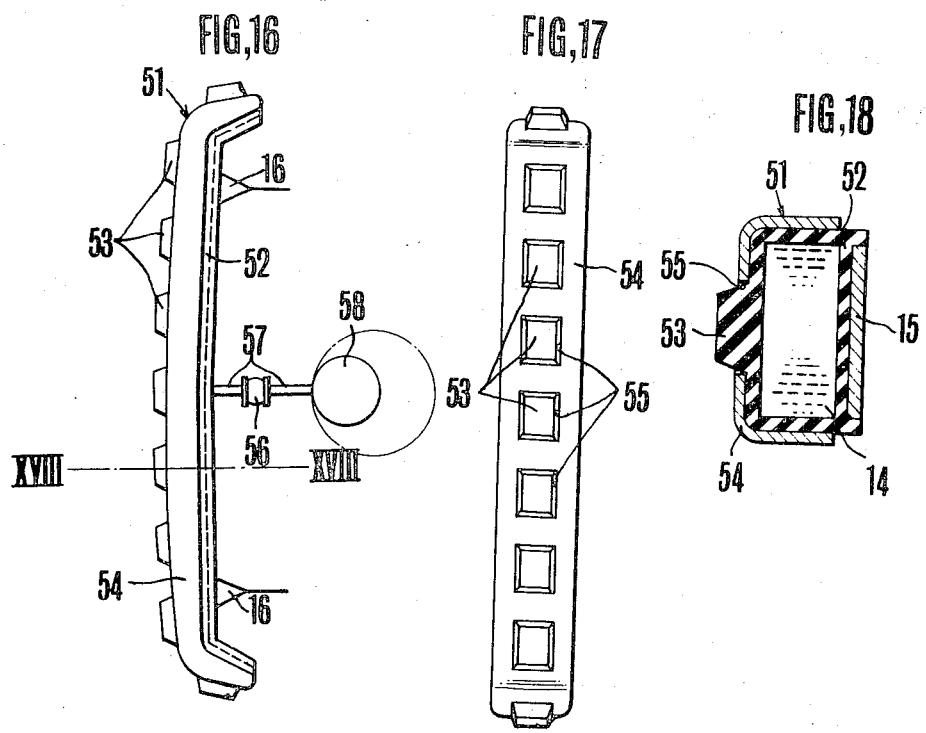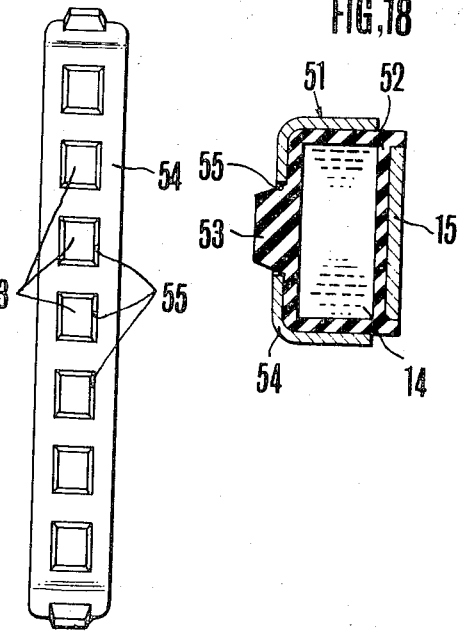

SHOCK ABSORBING BUFFER

BACKGROUND OF THE INVENTION

This invention relates to an automobile bumper and more particularly, to an automobile bumper of the shock absorbing type.

SUMMARY OF THE INVENTION

Broadly stated, the invention contemplates a bumper for vehicles, such as an automobile or a truck, with an elastic tubular hollow member filled with liquid or gas, a part of the fluid inside the tubular hollow member being caused to flow into an absorbing hollow member communicating with the tubular hollow member through a resistance tube or a check valve in case of a shock being given to the bumper, thereby substantially reducing the impact to the car.

The resistance tube consists of an elastic tubular member made of rubber, a constricted part being formed between two tubular parts, a number of slender grooves being formed inside said constricted part, the components being so arranged that, in case pressure is applied to the fluid, the constricted part expands to allow the fluid to flow into the other tubular part through the slender grooves thereof. Furthermore, when the fluid is free from pressure, the constricted part is narrowed with its slender grooves in a blocked state, thereby preventing the fluid from flowing from one tubular part into another tubular part.

When a shock is given to the bumper, the flow of the fluid from the tubular hollow member into the absorbing hollow member is comparatively slow through a resistance tube or a check valve, thereby absorbing the initial impact of the shock applied to the bumper, as a result of which the direct shock given to the automobile and the driver through the ordinary hard metal bumper is greatly relieved.

OBJECTS OF THE INVENTION

Thus, it is an object of the invention to so arrange the components that the bumper consisting of an elastic tubular hollow member filled with fluid will communicate with the absorbing hollow member through a check valve or a resistance tube, the fluid inside the tubular hollow member being discharged into the absorbing member through the check valve or the resistance tube when an increasing pressure is applied to the bumper consisting of a tubular hollow member filled with the fluid, said discharged fluid being retained inside the absorbing hollow member.

It is also an object of the invention to so arrange the components that the shock given to the car will be transmitted slowly, by interposing a check valve or a resistance tube between the bumper consisting of a tubular hollow member filled with fluid and the absorbing hollow member which absorbs said fluid, so that the fluid will flow comparatively slowly from the tubular hollow member into the the absorbing hollow member.

Another object of the invention is to provide a bumper consisting of an elastic tubular hollow member filled with fluid by dividing it into a number of blocks, thereby reducing the cost and simplifying the construction.

A further object of the invention is to so arrange the components that the absorbing hollow member will consist of an elastic material which has a greater contractile force than that of the tubular hollow member so that the fluid which flowed from the tubular hollow member into the absorbing hollow member may be restored to the tubular hollow member through the resistance tube by the contractile force of the absorbing member itself. Since slender grooves are provided inside the resistance tube, the contractile force of the absorbing hollow member enables the fluid therein to be gradually restored through said slender grooves thereby affording the advantage of constructional simplicity and practical convenience.

The foregoing objects are attainable by the improvement and combination of each component part constituting the invention, the embodiments whereof will be illustrated by the detailed description to be set forth hereinunder in reference to the annexed drawing, in which:

BRIEF DESCRIPTION OF THE DRAWINGS

FIG. 1 is a side elevation of an automobile equipped with the bumpers of the invention.

FIGS. 2 and 3 are plans showing the respective embodiments of the bumpers used in FIG. 1.

FIG. 4 is a sectional view taken at IV—IV in FIG. 2.

FIG. 5 is a sectional view of another embodiment of the bumper shown in FIG. 4.

FIG. 12 is a sectional view of a resistance tube employed in the invention.

FIG. 13 is a sectional view of the resistance tube in case the fluid passes therethrough.

FIG. 14 is a sectional view taken at XIV—XIV in FIG. 12.

FIG. 15 is a sectional view taken at XV—XV in FIG. 13.

FIG. 16 is a plan showing another embodiment of the bumper.

FIG. 17 is a plan view of the bumper in FIG. 1 viewed from the left side.

FIG. 18 is a sectional view taken at XUIII—XVIII in FIG. 16.

DETAILED DESCRIPTION

Figure 6:
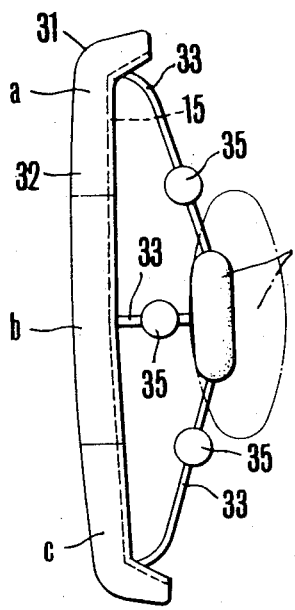
FIG. 6 is a sectional view of another embodiment of the bumpers shown in FIGS. 2 and 3, wherein the bumper consists of elastic material filled with fluid and is divided into three equal parts.

In FIGS. 1 to 5 the automobile A is equipped with bumpers 11,12 at the front and the rear thereof respectively, each bumper consisting of a tubular hollow ber 13 formed with elastic material, such as ber, soft synthetic resin and the like, the inside of tubular hollow member 13 being filled with fluid such as liquid, gas and the like.

urthermore, each of the bumpers 11,12 consisting ubular hollow member is equipped with a reinforcet core plate 15 on the reverse side thereof as shown IGS. 4 and 5, an arm 16 being led out from said plate 15, each of the bumpers 11,12 being inted to the automobile A by means of said arm 16.

loreover, it is so arranged that the bumper will comiicate with the absorbing hollow member 17 ough a check valve 18 or a resistance tube 19 pro;d between the bumper which consists of a tubular ow member 13 and the absorbing hollow member which is provided separately from the bumper and sists of elastic material of a greater contractile :e, so that the fluid 14 inside the bumper can flow the absorbing hollow member 17 when a shock is lied to the bumper.

Figure 7:
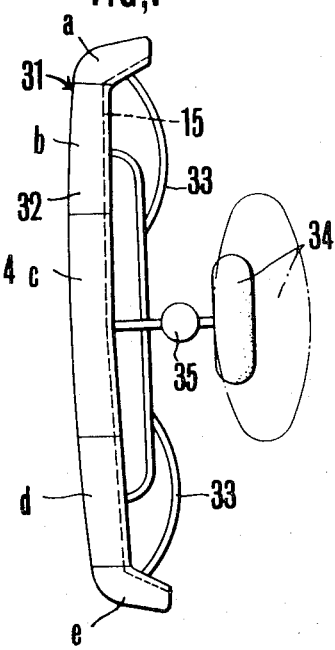
FIG. 7 is a sectional view of a bumper similar to that of FIG. 6, wherein the tubular hollow member is divided into five equal parts.

IG. 5 shows another embodiment of the bumpers ilrated in FIGS. 2 to 4, wherein a front and a rear mber 21,22 are formed by providing a partition 20 de the bumper 11 consisting of an elastic tubular ow member, a tubular hollow member 13 filled i fluid being housed in the chamber 21 and an abing hollow member 17 being housed in the mber 22 respectively, it being so arranged that said members will communicate with each other ough a check valve provided therebetween. Elastic erial of a greater contractile force than that of the ular hollow member 13 is used for the absorbing ow member 17, thereby enabling the fluid which /ed from the tubular hollow member 13 into the abing hollow member 17 to be restored by opening check valve 18 by means of an operation lever 24 truding outside the bumper 11.

he bumpers 31 shown in FIGS. 6 and 7 are other odiments of the bumpers illustrated in FIGS. 2 to 5. he embodiment shown in FIG. 6, the bumper con; of a tubular hollow member 32 which is divided three equal parts, a, b, c, each of said divided mems being incorporated on the reverse side thereof by a forcement core plate. Each of the tubular hollow nbers, a, b, c, communicates with the absorbing holmember 34 through pipes 33. Moreover, each pipe s provided with a resistance tube 35, the fluid flowfrom the tubular hollow member 32 into the abing hollow member 34 through said resistance :s 35.

ι case of the embodiment shown in FIG. 7, the iper 31 consists of a tubular hollow member 32 ch is divided into five equal parts, a, b, c, d, e.

/hen the bumper 31 is divided into three or five al parts as shown in FIGS. 6 and 7, and a shock is n to one part of the bumper 31, the consequential act is applied only to one of the tubular hollow nbers 32 corresponding to the part of the bumper re the shock was given, consequently the fluid insaid tubular hollow member alone flows into the orbing hollow member 34 through the resistance : 35.

ι other words, it is the fluid inside the tubular holmember that received a shock that is strongly ed into the absorbing hollow member 34 through the resistance tube 35 in case the tubular hollow member 32 is divided into a plurality of parts, as a result of which the shock can be remarkably reduced with effect.

Figure 8:
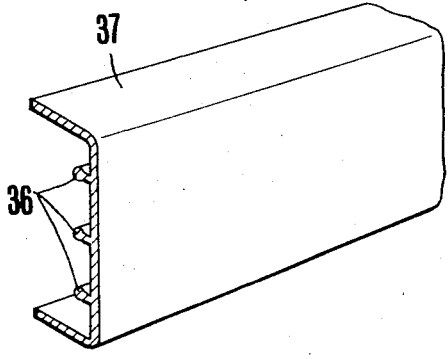
FIG. 8 is a perspective view of a reinforcement metal outside plate of a bumper, wherein several reinforcement ribs are provided lengthwise.

FIG. 8 shows still another embodiment of the invention, which is a reinforcement metal outside plate 37 for the bumpers shown in FIGS. 6 and 7, the internal wall of said plate 37 being provided with several reinforcement ribs 36.

Figure 9:
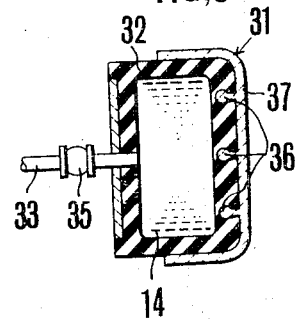
FIG. 9 is a sectional view of a bumper equipped with the reinforcement metal outside plate of FIG. 8 on the outside thereof.

FIG. 9 shows an instance wherein a reinforcement metal outside plate 37 provided with reinforcement ribs 36 is fitted to the outside of the bumper 31 consisting of elastic material. When the bumper 31 is equipped with the reinforcement metal outside plate 37, if a shock is given to one part of the bumper the impact is transmitted all over the bumper by the reinforcement metal outside plate 37, thereby remarkably increasing the shock absorption factor of the bumper.

Figure 10:
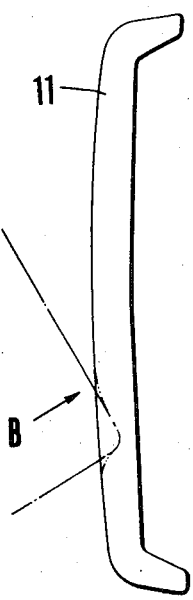
FIG. 10 is a diagram showing the shock absorption factor of the bumper when no reinforcement metal outside plate is used for said bumper.

FIG. 10 is a diagram showing the fact that, in case no reinforcement metal outside plate 37 is fitted to the outside of the bumper 11, as shown in FIGS. 2 and 3, the bumper is locally pressed by a shock, the shock absorbing effect being extremely reduced as a result.

Figure 11:
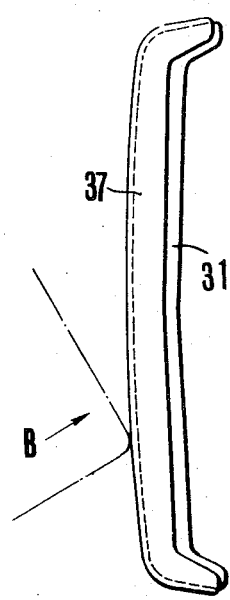
FIG. 11 is a diagram showing the shock absorption factor of the bumper when said bumper is equipped with the reinforcement metal outside plate.

FIG. 11 is a diagram showing the fact that, in case a reinforcement metal outside plate 37 provided with reinforcement ribs 36 therein, as shown in FIG. 8, is fitted to the bumper 31, a shock (B) applied to the bumper 31 acts as uniform impact thereto, with the result that the shock absorption factor of the bumper 31 is remarkably increased.

Each of the bumpers shown in FIGS. 11 and 12 can be used for the bumper of the shock absorbing system according to the invention.

FIGS. 12 to 15 show the resistance tube employed in the invention, which consists of a tubular member 35 of elastic material, such as rubber and the like, a constricted part 43 being formed between two elastic tubular parts 41,42, a number of slender grooves 44 being provided through the constricted part 43, said constricted part 43 expanding as shown in FIG. 13 when the fluid under pressure flows from one tubular part 41 into the other tubular part 43, thereby allowing the fluid to flow through the slender grooves 44 thereof.

Furthermore, when the fluid is free from pressure, the constricted part 43 is constricted narrowly with the slender grooves 44 thereof being in a blocked state, thereby preventing the fluid 14 from flowing from the tubular part 41 into the tubular part 42.

FIGS. 16 to 18 show another embodiment of the bumper wherein the bumper 51 consists of a tubular hollow member 52 formed with elastic material, such as rubber, soft synthetic resin and the like, just as in the case of the bumper shown in FIGS. 2 and 3, a number of thick projections 53 being erected on the front part thereof, said thick projections 53 effectively absorbing weak shocks that may be given to the automobile driven at low speed.

The numeral 54 designates a reinforcement metal outside plate mounted on the front of the tubular hollow member 52. Said reinforcement metal outside plate 54 is provided with a number of penetrating holes 55, the projections 53 of the tubular hollow member 52 being caused to protrude therethrough.

The reinforcement metal outside plate 54 has the effect of preventing the bumper 51 from receiving a pressure of impact locally by dispersing said pressure all over the bumper 51 in case the shock is given from the diagonally right or left direction to the front of the automobile.

The numeral 14 designates fluid filled inside the tubular hollow member 52, 15 designating a reinforcement core plate, 16 designating arms with which to fix the bumper 51 to the automobile.

Furthermore, the tubular hollow member 52 and the absorbing hollow member 58 communicate with each other through pipes 57 with a resistance member 56, such as a check valve, a resistance tube and the like, interposed therebetween.

As set forth above, in case of the bumper shown in FIGS. 16 to 18, the fluid filled inside the tubular hollow member 52 flows into the absorbing hollow member 58 through a resistance member 56, such as a check valve, a resistance tube and the like, if pressure is given to the tubular hollow member 52 as a result of an accident, such as a collision and the like, that may arise while the automobile is driven, part of the pressure being thereby absorbed by the absorbing hollow member 58.

In this embodiment of the bumper in particular, the thick projections 53 provided on the front face of the tubular hollow member 52 have the effect of absorbing weak shocks that may be given to the automobile driven at low speed. Moreover, the reinforcement metal outside plate mounted on the tubular hollow member 52 provided with thick projections 53 thereon has the effect of preventing the bumper 51 from receiving the pressure of impact locally by dispersing said pressure all over the bumper 51 in case the shock is given from the diagonally right or left direction to the front of the automobile.

As described heretofore, the bumper of the shock absorbing system according to the invention prevents accidents arising from unexpected collisions between vehicles by reducing the impact given to the bumper, wherein the fluid filled inside a tubular hollow member consisting of elastic material is pressed by the impact and flows into an absorbing hollow member through a resistance tube, thereby reducing the impact.

Upon receipt of impact, the fluid inside the tubular hollow member decreases its volume, increases its pressure, and flows into the absorbing hollow member through a check valve or a resistance tube.

Since a fixed amount of fluid is caused to flow through a check valve or a resistance tube which is comparatively restrictive, the impact to the bumper is remarkably relieved.

After the impact ceases, the fluid can be automatically restored to the tubular hollow member through the resistance tube, provided that said resistance tube is used, by means of the contractile force of the absorbing hollow member, said absorbing hollow member consisting of elastic material of very great contractile force, the foregoing fact constituting another merit of the bumper of the invention.

What is claimed is:

1. In an automobile bumper system wherein an elongated bumper (31) is stretched across one end of an automobile, the front of said bumper being designed to receive shock when said automobile end collides with an object, the improvement therein comprising:

a. a tubular hollow member (32) designed to store a fluid therein divided into a plurality of chambers defined by said bumper (31);
    b. a reinforcement metal outside plate (37) disposed over said bumper front side and, a plurality of reinforcement members extending across said bumper front side and embedded therein;
    c. a resistance tube (35) including fluid flow impeding means therein connected to each of said chambers, including first and second elastic tubular parts (41,42) in said resistance tube with a plurality of slender elastic grooves (44) defining a constricted part (43) between said first and second parts, said constricted part when free of fluid pressure being normally in a blocked state, but expanding to permit fluid passage when subject to fluid pressure.
    d. an absorbing hollow resilient contractible member (34) of great contractible strength coupled to said resistance tubes (35), whereby any shock applied to any part of said bumper is distributed over the entire bumper by said reinforce-members, and fluid in said chambers flows through said resistance tubes (35) to said contractible member expanding said member to absorb said shock, said fluid returning slowly to its former position upon the bumper being free of said shock.

2. A bumper system as claimed in claim 1, said resistance tube (35) having a check valve therein.

3. A bumper system as claimed in claim 1, said reinforcement members being longitudinal ribs attached to said reinforcement plate (37).

4. A bumper system as claimed in claim 1, said reinforcement members being a plurality of thick projections (53) on the front of said bumper, passing through apertures (55) in said reinforcing plate (54).

* * * * *